United States Patent [19]

Schumacher

[11] Patent Number: 4,650,580

[45] Date of Patent: Mar. 17, 1987

[54] FILTER CANDLE AND METHOD FOR PRODUCING THE SAME

[75] Inventor: Ivo Schumacher, Maennedorf, Switzerland

[73] Assignee: SrM, Dr. Müller AG, Switzerland

[21] Appl. No.: 754,190

[22] Filed: Jul. 10, 1985

Related U.S. Application Data

[63] Continuation of Ser. No. 529,534, Sep. 6, 1983, abandoned.

[30] Foreign Application Priority Data

Sep. 13, 1982 [CH] Switzerland .......................... 5419/82

[51] Int. Cl.$^4$ ...................... B01D 29/14; B01D 29/38
[52] U.S. Cl. .................... 210/323.2; 210/332; 210/346; 210/407; 210/486; 427/244; 427/421
[58] Field of Search ................. 210/323.1, 323.2, 324, 210/327, 330, 331, 332, 333.01, 346, 347, 357, 359, 407, 398, 461, 486, 483, 497.01, 769, 780, 791; 427/243, 244, 286, 421

[56] References Cited

U.S. PATENT DOCUMENTS 1,771,928  7/1930  Jung ............................. 210/333.01
2,362,231  11/1944 Ackerly, Jr. ........................ 210/486
3,935,105  1/1976  McEwen ............................. 210/138
4,526,688  7/1985  Schmidt, Jr. et al. ........... 210/323.2

FOREIGN PATENT DOCUMENTS 2308987  8/1974  Fed. Rep. of Germany .
2741639  3/1978  Fed. Rep. of Germany .
1363197  5/1964  France .

Primary Examiner—David Sadowski
Assistant Examiner—Wanda L. Millard
Attorney, Agent, or Firm—Michael J. Striker

[57] ABSTRACT

A filter candle element which is mounted in depending manner in a pressure container has a support body and a filter tissue which covers the support body and has at least one impermeable portion so as to prevent the depositing of a continuous filter cake. Through provision of a plurality of impermeable portions, the filter cake is divided into several pieces which do not obstruct their removal. The impermeable portions are obtained by spraying of synthetic material onto the filter tissue. These filter candle elements are especially suitable for alluvial filters of large dimensions.

9 Claims, 4 Drawing Figures

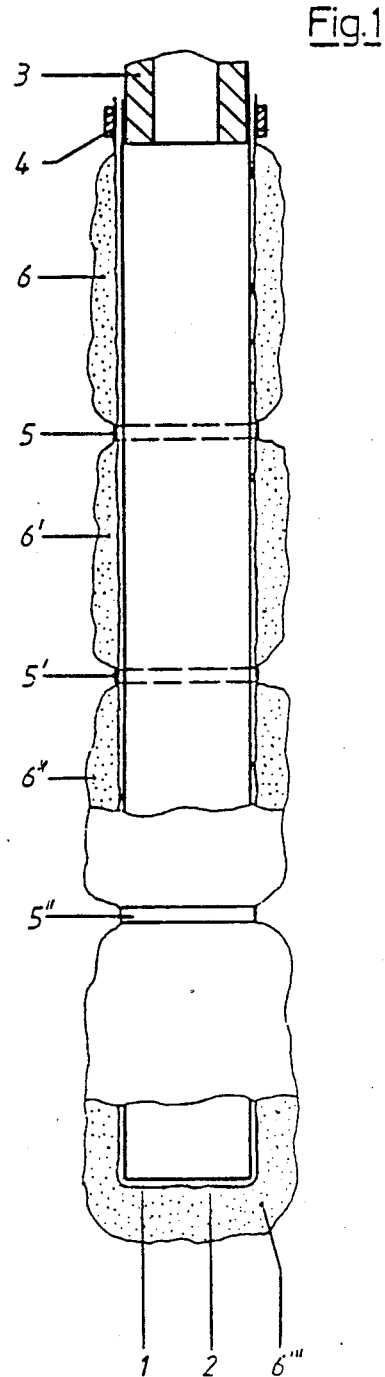
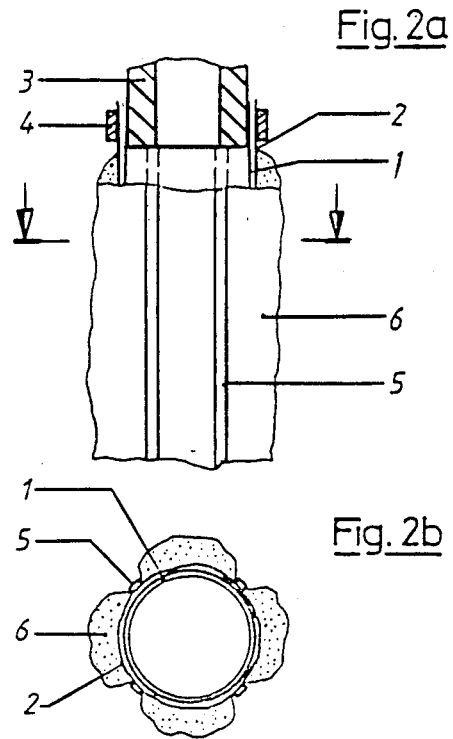
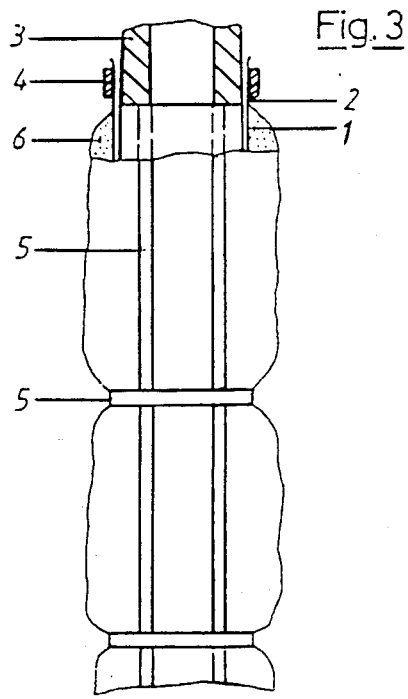
Fig. 1
Fig. 2a
Fig. 2b
Fig. 3

FILTER CANDLE AND METHOD FOR PRODUCING THE SAME

This application is a continuation of application Ser. No. 528,534, filed Sept. 6, 1983, now abandoned.

BACKGROUND OF THE INVENTION

The invention relates to a filter candle for a pressure filter for liquids in a pressure container.

Pressure filter elements of this kind are known in German Offenlegungsschrift No. 2,741,639, in which a plurality of depending filter elements are arranged in a pressure container and are covered with filter tissues.

The removal of filter cakes does not provide any difficulties in such filter elements, as long as the cake to be removed is in a relatively moist state. Problems do, however, occur when the filter cake should be discharged in a dry form. During the filtration, for example of lime, a filter cake continuously extending from the top to the bottom of 2-3 cm thickness is obtained on the filter surface of a, for example, 200 cm long and 8 cm thick filter element which is covered with a respective filter tissue. Upon backwashing with air, the cake is dropped in form of 20-50 cm long pieces. During the dry discharge of the filter cake, these pieces can jam with each other between adjacent filter elements and consequently do not drop to the bottom of the container, thereby obstructing the discharge. This is especially true when long filter candles are concerned, which generate large and long filter cake pieces.

SUMMARY OF THE INVENTION

It is an object of the present invention to avoid the prior-art disadvantages.

In particular, it is an object of the present invention to provide a filter candle which achieves the generation of a smaller pieces and consequently an improved discharge of the filter cake.

Still another object of the present invention is to provide a method for production of such a filter candle.

A concomitant object of the present invention is to provide a filter candle which is simple in construction, reliable in operation and inexpensive nevertheless.

In keeping with these objects and with others which will become apparent hereinafter, one feature of the present invention resides in a filter candle element, which comprises a support body having a longitudinal axis and a filter tissue covering the support body and having at least one impermeable portion so as to prevent the depositing of a continuous filter cake. Preferably, the filter tissue is provided with a plurality of impermeable portions spaced from each other at predetermined distances along the longitudinal axis so as to divide the deposited filter cake into a plurality of pieces.

The impermeable portions are either circular-shaped around the support body or extend parallel to the longitudinal axis and have a width of approximately 0.5 to 3 cm. The distances between the respective portions is preferably 5-20 cm.

Through the provision of such a filter element, a plurality of filter cake pieces of a maximum length of 20 cm is obtained. Upon backwashing of the filter elements in order to remove the filter cake, these pieces drop easily to the bottom and considerably reduce the possibility of a jamming or clogging in comparison to the long pieces as obtained so far.

The novel features which are considered characteristic for the invention are set forth in particular in the appended claims. The invention itself, however, both as to its construction and its method of operation, together with additional objects and advantages thereof, will be best understood from the following description of specific embodiments when read in conjunction with the accompanying drawing.

BRIEF DESCRIPTION OF THE DRAWING

FIG. 1 is a longitudinal section of a first embodiment of a filter element according to the invention;

FIG. 2a is a longitudinal section of a second embodiment of a filter element according to the invention;

FIG. 2b is a cross-sectional view of the filter element according to FIG. 2a; and FIG. 3 is a third embodiment of the filter element according to the invention.

DESCRIPTION OF THE PREFERRED EMBODIMENTS

Referring firstly to FIG. 1, there can be seen a filter element consisting of a perforated support body 1 which is covered by a filter tissue 2. The filter tissue 2 forms a tube which is closed at its lower portion and open at its upper portion, which is mounted to an outlet pipe 3 by means of a fixing ring 4. The filter tissue, which is gas- and liquid-permeable, is provided at distances of 5-20 cm with rings 5 and/or strips which are impermeable. Depending upon the length of the filter element, any desired number of such rings 5 can be provided. A filter cake 6, 6', 6", 6''' can thus be deposited only on the permeable portions of the filter tissue, so that the provision of one continuous filter cake is prevented.

In FIGS. 2a, b there is shown a second embodiment illustrating the filter tissue provided with impermeable longitudinally extending portions 5 wherein FIG. 2a is the longitudinal section thereof while FIG. 2b is a cross-sectional view of the filter element. Consequently, a plurality of longitudinally extending filter cake pieces are obtained, as can be especially seen from FIG. 2b.

In case larger surfaces are obtained, a combination of longitudinally extending and circular-shaped portions can be provided, as can be seen from FIG. 3.

The impermeable portion 5 can be provided in a known manner by spraying a synthetic plastic, for example synthetic resin, onto the filter tissue in distances of approximately 5-20 cm, preferably 8 cm, and in a width of 0.5-3 cm, preferably 1 cm.

The method of providing the filter candle element includes the steps of: providing a support body; providing a filter tissue; forming on the filter tissue at least one impermeable portion; and covering the support body with the so obtained filter tissue; wherein the forming step includes spraying a synthetic plastic material onto the filter.

Upon removing of the filter cake through backwashing, for example with a gas, the filter cake pieces which have a maximum length of 20 cm can easily drop to the bottom and have a reduced inclination for clogging as long pieces.

It will be understood that each of the elements described above, or two or more together, may also find a useful application in other types of filter candle elements differing from the types described above.

While the invention has been illustrated and described as embodied in a filter candle element and method of producing the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A filter candle element, comprising a support body having a longitudinal axis; a permeable filter tissue covering said support body and having an open upper end suspendably mountable to an outlet pipe, and being formed for filtration and further susceptable to depositing of a filter cake on its outer surface; a plurality of impermeable members applied at equal distances from one another directly on the outer surface of said filter tissue, each of said impermeable members having a width between 0.5 and 3 cm, and being formed so that the filtration cannot take place through said members and therefore the filter cake is not deposited on said tissue where said impermeable members are applied, so as to prevent the depositing of a continuous filter cake, wherein the filter tissue is provided with at least one impermeable member being circularly shaped and at least one impermeable member extending parallel to the longitudinal axis.

2. A filter element as defined in claim 1, wherein the circularly shaped impermeable members extend parallel to each other in the direction of the longitudinal axis.

3. A filter candle element as defined in claim 1, wherein the impermeable member has a width of 1 cm.

4. A filter candle element as defined in claim 1, wherein the impermeable members have a distance from one another of 5-20 cm.

5. A filter candle element as defined in claim 1, wherein the impermeable members have a distance from one another of 8 cm.

6. A filter candle element as defined in claim 1, wherein said impermeable member is formed as a strip.

7. A filter candle element, comprising a support body having a longitudinal axis; a permeable filter tissue covering said support body and having an open upper end suspendably mountable to an outlet pipe, and being formed for filtration and further susceptable to depositing of a filter cake on its outer surface; and a plurality of impermeable members applied at equal distances from one another directly on the outer surface of said filter tissue, each of said impermeable members having a width between 0.5 and 3 cm, and being formed so that the filtration cannot take place through said members and therefore the filter cake is not deposited on said tissue where said impermeable members are applied, so as to prevent the depositing of a continuous filter cake, the impermeable portions being each circular-shaped and extending around the support body and being spaced from each other at predetermined distances.

8. A method for producing a filter candle element, comprising the steps of: providing a support body; providing a filter tissue; forming on the filter tissue at least one impermeable portion; and covering the support body with the so obtained filter tissue, wherein the forming step includes spraying a synthetic plastic material onto the filter tissue.

9. A method as defined in claim 8, wherein the spraying step includes spraying a synthetic resin onto the filter tissue.

* * * * *